United States Patent Office 3,096,297
Patented July 2, 1963

3,096,297
ARTIFICIAL BOARD AND PROCESS FOR PREPARING SAME
Melvin E. Peterkin, Brookhaven, and Stewart S. Kurtz, Jr., Merion Station, Pa., assignors to Sun Oil Company, Philadelphia, Pa., a corporation of New Jersey
No Drawing. Filed Mar. 15, 1961, Ser. No. 95,790
6 Claims. (Cl. 260—9)

This invention relates to improvements in artificial boards bonded by heat and pressure from a filler and a thermoplastic hydrocarbon resin.

In the past resins have been prepared from aromatic petroleum fractions and formaldehyde in the presence of an acid catalyst. When these resins are combined with cellulose or lignocellulose fillers under heat and pressure, the resulting molded shapes lack sufficient strength in comparison with commercial materials such as Masonite.

The object of this invention is to provide a superior artificial board having a petroleum resin binder. A particular object of the invention is to provide a high strength hardboard having a sawdust and/or shredded paper filler. We have found that additional strength is achieved by the addition of hexamethylenetetramine to the resin and filler prior to the molding operation.

Hexamethylenetetramine has been used previously as a hardening agent for thermosetting resins and with certain other resins as disclosed in U.S. Patent No. 2,418,293. With petroleum resins, however, the addition of hexamethylenetetramine had no significant effect—as will be seen from the examples appearing later in the disclosure. We have discovered that when hexamethylenetetramine is added in small amounts to mixtures of petoleum resins and a cellulose or lignocellulose filler prior to hot pressing, the resulting artificial board product is stronger.

The hydrocarbon resin component of the present invention is made by condensing a hydrocarbon oil with an aldehyde in the presence of an acid catalyst. The hydrocarbon oil is a fraction containing substantial amounts of aromatic hydrocarbons. The boiling range of the oil is from about 200° F. to 650° F. Sources of the oil include recycle streams from catalytic and thermal cracking, fractions separated by distillation and solvent extraction and blended aromatic stocks. It is desirable that the oil contain from 20–100% aromatic hydrocarbons, preferably from 25–50% aromatics.

Paraformaldehyde is the preferred condensing agent although formaldehyde, formalin, and other carbonyl compounds can be used.

Suitable condensation catalysts include formic acid, sulfuric acid, metal chlorides and hydrogen halides such as HF. Formic acid is preferred because of the high quality resin produced when it is used as catalyst.

The reaction conditions employed in producing the resin depend upon the catalyst and other factors. Generally speaking, temperatures of 80 to 200° C., pressures of atmospheric to 300 p.s.i.g. and oil-aldehyde molar ratios of 1.0:1.0 to 2.0:1.0 are suitable. The catalyst can be present in amounts ranging from 25 to 100% by volume based on the aromatic oil feed.

Following condensation, the lower boiling fraction having a vapor temperature endpoint of from 800 to 950° F. at atmospheric pressure is distilled off. Vacuum distillation of 5 mm. to a vapor temperature endpoint of from about 480° F. to 610° F. is preferable.

The resulting resin will have an initial boiling point of from 800–950° F. and a ring and ball softening point of 80–150° C.

Table I, below, shows the resins resulting from condensation in the presence of a formic acid catalyst at the conditions indicated. In all cases the reaction mixture was agitated with a motor driven stirrer.

TABLE I
*Comparison of Runs at Various Temperatures and Pressures*

RUNS ON PRESSURE REACTOR [a]

| Run No. | Chg. Stk.[e] | Reaction | | | | Products | | | | | | | | Total, >650° C. |
|---|---|---|---|---|---|---|---|---|---|---|---|---|---|---|
| | | | | | | Soft | | Intermediate resin | | | | Final resin | | |
| | | Temp., °C. | Pressure, p.s.i.g. | Time, hrs. | Ml. | B.R., °F.[d] | Grams | B.R., °F.[d] | Ring and ball, °C. | Appearance [f] | Grams | B.R., °F.[d] | Ring and ball, °C. | Appearance [f] | |
| 1 | 10-3 | 100 | Atm. | 6 | 10 | 638-864 | 14.6 | 864-925 | 78 | 6 E | 9.5 | >925 | 142 | 6 F | 33.3 |
| 2 | 12-3 | 140 | 80-110 | 0.5 | 41 | 662-824 | 14 | 824-864 | | 2 C | 15.8 | >864 | 94 | 6 F | 80.8 |
| 3 | 12-3 | 140 | 80-128 | 1 | | 651-822 | 36 | 822-894 | 61 | 4 C | 13.6 | >894 | 114 | 6 F | |
| 4 | 10-7 | 140 | 80-120 | 2 | 39 | 651-864 | 31.1 | 864-477 | 67 | 4 C | 22.6 | >977 | 134 | 6 F | 89 |
| 5 | 10-7 | 160 | 100-185 | 2 | 32 | 651-814 | 44.6 | 814-944 | 57 | 4 C | 39.7 | >944 | 119 | 6 E | 113 |
| 6 | 10-7 | 180 | 100-195 | 0.42 | 19 | 651-737 | 60.1 | 737-944 | 49 | 5 C | 34.0 | >944 | 123 | 6 E | 111 |
| 7 | 10-7 | 180 | 80-135 | 2 | 17 | 651-700 | | | | | 0.5 | >700 | | 6 G | [b] 15 |

RUNS IN GLASS REACTOR AT ATMOSPHERIC PRESSURE [c]

| 8 | 10-3 | [1] 102 | Atm. | 6 | 11 | 650-814 | 31 | 814-930 | 64 | 5 C | 23 | >930 | 118 | 6 E | 65 |
| 9 | 10-7 | [1] 102 | Atm. | 6 | 10 | 651-694 | 56 | 694-931 | 59 | 5 C | 36 | >930 | 106 | 6 E | 102 |

[a] 500 ml. oil in reactor brought to temperature, then solution of $CH_2O$ in $CHOOH$ (20 g./125 ml.=0.16 g./ml. acid) added from blowcase.
[b] Acetic acid catalyst.
[c] Regular run in glass reactor; 3,000 ml. oil, 725 ml. acid, 120 g. paraformaldehyde (0.16 g./ml. acid). Data shown are ⅙ actual—to provide comparison with pressure reactor runs.
[d] Boiling points are "equivalent atomospheric" figures converted from vacuum distillation data.
[e] See the following table:

| Charge | Type | $N_D^{20}$ | $d_4^{20}$ | Gel aromatics | mdM | | |
|---|---|---|---|---|---|---|---|
| | | | | | Percent $C_A$ | Percent $C_N$ | Percent $C_P$ |
| 10-3 | Cat. gas oil | 1.4875 | 0.8644 | 31.9 | 23 | 22 | 55 |
| 12-3 | do | 1.4987 | 0.8791 | 48.2 | 28 | 20 | 52 |
| 10-7 | do | 1.4991 | 0.8753 | 41.8 | 30 | 16 | 54 |

[f] 1, liquid; 2, viscous liquid; 3, soft plastic; 4, intermediate plastic; 5, hard plastic; 6, brittle. A, water white clear; B, light yellow clear; C, yellow clear; D, deep yellow clear; E, brown; F, dark brown; G, black.
[1] Reflux.

The products in Table I above are divided into soft, intermediate and final resins. The final resins are used in making the artificial board of the invention. The final resins are obtained by vacuum distillation and represent about 10–15% by volume of the total resin product. The table shows that the use of elevated temperatures and pressures (runs 1–7) speeds up the reaction considerably over low temperature operation at atmospheric pressure (runs 8 and 9).

The final resins are solid at room temperature and have a ring and ball softening point of from about 90–150° C.

Other petroleum resins than those shown above can be used as the resin component of the artificial board of the present invention.

The resin is employed in amounts ranging from 5 to 30% by weight, preferably from 15 to 25% by weight.

The filler material employed in making artificial board may be wood, paper, straw, corn stalks, bagasse, nut shells, and other fibers from naturally occurring and man-made sources. A particularly suitable material is sawdust. The latter has not been popular for making hardboard because the fibers are too short. Commercial hardboards contain fillers made by special treatment of wood. We have found that sawdust is well suited as an extender for petroleum resin when it is used in conjunction with hexamethylenetetramine. We have also found that paper fiber such as shredded newsprint alone or in conjunction with sawdust provides a high strength hardboard.

The sawdust may be coarse, medium, fine, or mixed. The filler is present in amounts ranging from 50 to 95% by weight, preferably from 70 to 85% by weight, based on the total mixture.

Hexamethylenetetramine is present in amounts ranging from 0.1 to 6% by weight, preferably from 1.0 to 4.5% by weight.

The hardboard of the present invention may be made by any of the many methods employed in molding operations of this type. Broadly speaking, the mixture to be molded is mixed to provide good distribution of the ingredients. The resin is usually ground to a fine powder prior to the mixing step. The mixture is then placed in the mold and heated while pressure is applied. Temperatures in the range of 250–450° F. and pressures of 200 to 10,000 p.s.i. are suitable. A continuous process can be used if desired.

The following examples in Table II show the effect of changing various components and conditions in making hardboard. The mold was the standard 2″ x 6″ x 3/16″ size used for making test blanks.

TABLE II

*Variable Study of Petroleum Resins in Wallboard Type Formulation*

| Variable | Percent of wood | Percent of resin [1] | Percent of hexa | Mold time | Mold temp. | Mold pressure | Weight of chg. (g.) | Variable | 28° C. modulus of rupture | Bend .001″ | Weight Loss (g.) | 80° C. modulus of rupture |
|---|---|---|---|---|---|---|---|---|---|---|---|---|
| | | | | | | | | Series 1 | | | | |
| Temp.-mold | 40 | 8 | 2 | 10 | (2) | 10,000 | 50 | 250° F | 3,000 | 530 | | |
| | | | | | | | | 300° F | 2,500 | 380 | | |
| | | | | | | | | 350° F | 3,700 | 400 | | |
| | | | | | | | | Series 2 | | | | |
| | | | | | | | | 250° F | 2,703 | 260 | | |
| | | | | | | | | 300° F | 2,600 | 265 | | |
| | | | | | | | | 350° F | 2,640 | 300 | | |
| Time | 40 | 8 | 2 | (2) | 325 | 10,000 | 50 | 2 min | 3,600 | 313 | 7.1 | |
| | | | | | | | | 5 min | 3,500 | 310 | 7.9 | |
| | | | | | | | | 10 min | 4,140 | 285 | 7.6 | |
| | | | | | | | | 20 min | 2,820 | 218 | 9.0 | |
| Resin | 40 | (2) | 2 | 10 | 325 | 10,000 | 50 | 8 g | 3,100 | 213 | 7.1 | <1,000 |
| | | | | | | | | 6 g | 3,000 | 255 | 6.1 | <1,000 |
| | | | | | | | | 4 g | 2,820 | 250 | 4.3 | <1,000 |
| | | | | | | | | 2 g | 1,650 | 260 | 3.9 | <1,000 |
| Hexa | 40 | 6 | (2) | 10 | 325 | 10,000 | [3] 46 | 2 g | 3,370 | 275 | 6.0 | <840 |
| | | | | | | | | 1.5 g | 2,690 | 275 | 5.8 | <840 |
| | | | | | | | | 1.0 g | 2,760 | 252 | 5.6 | <840 |
| | | | | | | | | 0.5 g | 2,400 | 265 | 5.6 | <840 |
| | | | | | | | | 0 g | 2,310 | 300 | 5.3 | <840 |
| Weight chg. to mold. | 40 | 8 | 2 | 10 | 325 | 10,000 | (2) | 30 g | <940 | | 30–28.4= 1.6 | |
| | | | | | | | | 40 g | 1,820 | 258 | 40–36.4= 3.6 | |
| | | | | | | | | 50 g | 3,480 | 293 | 50–41.7= 8.3 | |
| | | | | | | | | 60 g | 5,170 | 183 | 60–48 =12 | |
| Size of wood dust | 40 | 6 | 2 | 10 | 325 | 10,000 | 50 | Coarse medium (avg.) fine. | 2,950 | 250 | 6.0 | 1,330 |
| | | | | | | | | | 2,880 | 260 | 6.1 | 1,070 |
| | | | | | | | | | 3,530 | 280 | 5.8 | 1,090 |
| Resin melt point | 40 | 6 | 2 | 10 | 325 | 10,000 | 50 | #217 100° C | 3,000 | 150 | 6.2 | 1,520 |
| | | | | | | | | #200B 100° C | 3,420 | 193 | 6.3 | 1,160 |
| | | | | | | | | #209 92° C | 2,900 | 191 | 6.3 | <940 |
| | | | | | | | | #200A 84° C | 2,880 | 240 | 6.7 | 890 |
| | | | | | | | | #219 80° C | 3,000 | 255 | 6.1 | |

[1] Resin #219, Ring & Ball M.P. 80° C.
[2] Variable: see column at right for numbers.
[3] Plus hexa.

The table shows that without hexamethylenetetramine the modulus of rupture (28° C.) was 2,310. This value increased to 3,370 with the addition of 2.0 gms. of hexamethylenetetramine. This was an unexpected development in view of the following data which shows that hexamethylenetetramine has no effect on the resin alone.

Eight grams of petroleum resin similar to those disclosed in Table I were mixed with two grams of hexamethylenetetramine and heated to 325° F. at 800 p.s.i.g. for 10 minutes. The same treatment was given to the resin alone. Ring and ball softening points of the two samples were obtained. The resin containing hexamethylenetetramine had a softening point of 94° C. and the plain resin had a softening point of 92° C. which indicates that the hexamethylenetetramine has little or no effect on the petroleum resin.

Table III shows the effect of mixing various amounts of sawdust and paper with the resin and hexamethylenetetramine. With 20 weight percent sawdust and 80% paper, a modulus of rupture of over 6000 was achieved.

TABLE III

*Effect of Varying Wood to Paper Fiber Content of Pressed Hardboard*

|   | Grams wood powder | Grams paper fibre | Grams resin | Grams hexa | Wood/paper | Mod. of rupture at 28° C. |
|---|---|---|---|---|---|---|
| A | 40 | 0 | 0 | 0 | 100/0 | 750 |
| B | 40 | 0 | 0 | 2 | 100/0 | 1,000 |
| I | 40 | 0 | 8 | 2 | 100/0 | 3,100 |
| II | 36 | 4 | 8 | 2 | 90/10 | 4,000 |
| III | 32 | 8 | 8 | 2 | 80/20 | 5,300 |
| IV | 24 | 16 | 8 | 2 | 60/40 | 5,350 |
| V | 16 | 24 | 8 | 2 | 40/60 | 5,550 |
| VI | 8 | 32 | 8 | 2 | 20/80 | 6,850; [1] 7,400 |
| VII | 4 | 36 | 8 | 2 | 10/90 | 7,650 |
| VIII | 0 | 40 | 8 | 2 | 0/100 | 6,200 |
| C | 0 | 40 | 0 | 2 | 0/100 | 2,900 |
| D | 0 | 40 | 0 | 0 | 0/100 | 1,850 |

[1] Repeat run.

Various modifications of the invention such as blending of resins, the employment of fireproofing agents and the formation of the artificial board into floor tiles and the like will be apparent from the foregoing description to those skilled in the art.

We claim:

1. An artificial board consisting essentially of a heated and compressed mixture of from 5.0 to 30.0 wt. percent of petroleum resin prepared by the condensation of an aldehyde and a hydrocarbon fraction containing aromatic hydrocarbons boiling in the range of from about 200° F. to about 650° F. in the presence of an acid catalyst, at condensation conditions suitable for the particular aldehyde, hydrocarbon fraction and catalyst employed, from 75.0 to 95.0 wt. percent of a cellulosic filler and from 0.1 to 6.0 wt. percent hexamethylenetetramine.

2. An artificial board according to claim 1 in which the cellulosic filler is sawdust.

3. An artificial board according to claim 1 in which the cellulosic filler is ground paper.

4. An artificial board according to claim 1 in which the cellulosic filler is a mixture of ground paper and sawdust.

5. A process for making artificial board which comprises heating and pressing a mixture of from about 0.1 to about 6.0 wt. percent hexamethylenetetramine and from about 75.0 to about 95.0 wt. percent of a cellulosic filler with from about 5.0 to about 30.0 wt. percent petroleum resin prepared by condensing a hydrocarbon fraction boiling in the range of from about 200° F. to about 650° F. containing aromatic hydrocarbons with formaldehyde in the presence of an acid catalyst, at a temperature in the range of 80–200° C. and a pressure in the range of atmospheric to 300 p.s.i.g., and separating the said resin.

6. The artificial board produced by the process of claim 5.

References Cited in the file of this patent

UNITED STATES PATENTS

| 2,054,243 | Cowdery | Sept. 15, 1936 |
| 2,397,398 | Badertscher et al. | Mar. 26, 1946 |
| 2,418,293 | Farber | Apr. 1, 1947 |

OTHER REFERENCES

Ellis: "Chemistry of Synthetic Resins," volume 1, published by Reinhold Publishing Company, 1935, page 695.